US006181170B1

(12) United States Patent
Koifman

(10) Patent No.: US 6,181,170 B1
(45) Date of Patent: Jan. 30, 2001

(54) DRIVER HAVING SUBSTANTIALLY CONSTANT AND LINEAR OUTPUT RESISTANCE, AND METHOD THEREFOR

(75) Inventor: Vladimir Koifman, Rishon-Lezion (IL)

(73) Assignee: Motorola Inc., Schaumburg, IL (US)

( * ) Notice: Under 35 U.S.C. 154(b), the term of this patent shall be extended for 0 days.

(21) Appl. No.: 09/350,164

(22) Filed: Jul. 9, 1999

(51) Int. Cl.$^7$ ............................... H03B 1/00; H03K 3/00
(52) U.S. Cl. ......................... 327/108; 327/563; 330/253
(58) Field of Search ........................... 327/108–112, 333, 327/563; 326/81, 83; 330/252, 253

(56) References Cited

U.S. PATENT DOCUMENTS

| 4,380,706 | * | 4/1983 | Wrathall | 327/563 |
|---|---|---|---|---|
| 4,591,801 | * | 5/1986 | Yamaguchi et al. | 330/253 |
| 5,287,068 | * | 2/1994 | Olmstead et al. | 330/253 |
| 5,512,853 | * | 4/1996 | Ueno et al. | 327/333 |
| 5,559,448 |   | 9/1996 | Koenig | 326/30 |
| 5,933,041 | * | 8/1999 | Sessions et al. | 327/108 |
| 5,977,819 | * | 11/1999 | Sanwo et al. | 327/563 |
| 6,011,436 | * | 1/2000 | Koike | 330/253 |

OTHER PUBLICATIONS

"Draft Standard for Low–Voltage Differential Signals (LVDS) for Scalable Coherent Interface (SCI)", Draft 1.3, Nov. 27, 1995, IEEE P1596.3–1995, pp. 1–34.
Horowitz, P., Hill, W.: "The Art of Electronics", Second Edition, Cambridge University Press, 1990, ISBN 0–521–37095–7, chapter 6.15 Bandgap reference on pp. 335–341.

* cited by examiner

Primary Examiner—Terry D. Cunningham
Assistant Examiner—Long Nguyen

(57) ABSTRACT

A transmitter module (100) for LVDS systems provides differential data transmission ($\Delta V$ between lines 1, 2) with an resistance ($R_{OUT}$) which is substantially independent from the manufacturing process and which is substantially linear over the whole range of signal voltages ((B): $\Delta V_{MAX}$ and (C): $\Delta V_{MAX}/2$). The driver (100) comprises a self-adjusting bias circuit (201, 202) for the output stages (110, 120) which monitors the currents into the lines and which sets the line output voltages to predetermined values (ABC) when predetermined currents are detected.

7 Claims, 3 Drawing Sheets

DRIVER HAVING SUBSTANTIALLY CONSTANT AND LINEAR OUTPUT RESISTANCE, AND METHOD THEREFOR

FIELD OF THE INVENTION

The present invention generally relates to electronic circuits, and, more particularly, to drivers for differential data transmission lines and to a method therefore.

BACKGROUND OF THE INVENTION

In modern electronic systems, such as computers, telephone exchanges and others, data has to be transmitted, for example, between integrated circuits (ICs) located on a printed circuit board (PCB) or between different boards. To achieve a high transmission speed while keeping power dissipation low, differential data lines are getting more and more importance.

FIG. 1 illustrates a simplified block diagram of data transmission system 10 according to the "Draft Standard for Low-Voltage Differential Signals (LVDS) for Scalable Coherent Interface (SCI)", Draft 1.3 IEEE P1596.3-1995. System 10 comprises lines 1 and 2, driver 3 (or "transmitter module"), symmetrically arranged load resistors 4 and 5 (each having equal values, e.g., $R_1=R_2=50\ \Omega$), and voltage sources 6 and 7, coupled as illustrated. Usually, lines 1 and 2 each have a length of several meters (maximum about 10 meters).

Line voltages $V_1$ and $V_2$ and rated voltage $V_{RATED}$ are defined to ground 8 (e.g., potential GND $\approx$zero)). A voltage swing $\Delta V$ is defined as being positive. The terminating voltage $V_{CENTER}$ is defined between node 9 (coupling resistors 4 and 5) and ground 8 (potential GND).

Driver 3 differentially transmits binary signals having first and second logical values (differential mode (DM) transmission). Driver 3 either (a) simultaneously pulls lines 1 and 2 to $$V_1=(V_{RATED}+\Delta V),\text{ and}$$

$$V_2=(V_{RATED}-\Delta V), \quad (2)$$

or (b) simultaneously pulls lines 1 and 2 to $$V_1=(V_{RATED}-\Delta V),\text{ and}$$

$$V_2=(V_{RATED}+\Delta V). \quad (4)$$

Convenient values for rated voltages are $V_{RATED)=}1200$ mV (milli volts). The voltage swing is conveniently $\Delta V<250$ mV ($\Delta V_{MAX=}250$ mV). In other words, in case (a), the positive voltage difference $$(V_1\_V_2)=2^*\Delta V \quad (6)$$

represents a first logical value; and in case (b), the negative voltage difference $$(V_1\_V_2)=-2^*\Delta V \quad (8)$$

represents a second, opposite logical value.

Changes between logical values can conveniently be transmitted at data rates up to 250 megabit per second (MBs). Higher rates, e.g., up to 850 MBs (or even higher) are also possible.

Neglecting the current from node 9 to ground 8, currents $I_{1=2}=I$ through lines 1 and 2 are limited to $$|I_{MAX}| = |2*\Delta V_{MAX}|/(R_1+R_2) \quad (10)$$

$$|I_{MAX}| = |500\text{ mV}|/(100\ \Omega) \quad \text{(example)}$$

$$= 5\text{ mA (milli ampere)}$$

The | | symbols stand for absolute values.

However, the differential signal transmission is subject to common mode (CM) fluctuations. For example, voltage $V_{CENTER}$ at node 9 can have the following time function:

$$V_{CENTER}\ (t)=V_{DC}+V_{AC}^*\sin(2^*\pi^*f^*t) \quad (12)$$

Usual values are $V_{DC}=V_{RATED}$ and $V_{AC}=V_{RATED}$ (a.c. amplitude). The fluctuation frequency f can have magnitudes from substantially zero to about 1000 MHz (i.e., four times the data rate). The common mode fluctuations should not influence the differential mode signal transmission.

Driver 3 should drive both lines symmetrically over the whole range of $V_{CENTER}$. The standard requires a specific internal resistance for output of driver 3 so that no reflections arise at the output even with returning waves potentially occurring due to asymmetries or disturbances. In other words, there is a need to match the impedances of driver output, transmission lines and load. A transmission gate providing proper impedance is explained in U.S. Pat. No. 5,559,448 to Koenig.

In other words, there is a requirement to provide such a driver which keeps its output resistance for both lines constant and linear over the whole magnitude range of $V_{CENTER}$ (cf. equation (12)).

DETAILED DESCRIPTION OF A PREFERRED EMBODIMENT

In the following, the term "transistor" is intended to include any device having at least two main electrodes (e.g., drain D and source S) and a control electrode (e.g., gate G). The impedance between the main electrodes is controlled by a signal applied to the control electrode. Which electrode is the drain D and which is the source S, depends on the applied voltages, so D and S are distinguished here only for the convenience of explanation.

Preferably, a preferred embodiment of the present invention is implemented with field effect transistors (FETs) in well known CMOS technology. The terms "first type" (e.g., N-FETs or P-FETs) and "second type" (e.g., P-FETs or N-FETs) are intended to distinguish complementary transistors of opposite conductivity. "First type" and "second type" can refer to either N-FETs or P-FETs, as the case may be. For convenience, the figures symbolize P-FETs by a circle at the gate. Persons of skill in the art are able, without the need of further explanation herein, to revert the transistor conductivities (i.e., using P-FETs for N-FETs and vice versa). A "conductive" transistor is able to carry a current between its main electrodes; wheras a "non-conductive" transistor is substantially not able to carry a current.

The term "scale" and its variations are intended to indicate predetermined and substantially constant magnitude relations between currents, voltages or transistor dimensions. For example, first and second transistors can have first and second current conduction paths (e.g., drain–source), respectively, which are in a predetermined magnitude ratio to each other. Hence, when the same control signal is applied at the control electrodes of both transistors, the transistor currents are related by the same ratio. Similarly, a first current can be a replica of a second current when first and second currents are related by a predetermined ratio.

According to the present invention, a transmitter module (cf. FIG. 2, driver 100) provides differential data transmission (e.g., via $V_1$, $V_2$ on lines 1, 2) with an impedance (resistance) which is substantially independent from the manufacturing process and which is substantially linear over the whole range of signal voltages (cf. conditions (B) and (C)). The driver comprises a self-adjusting bias circuit (bias circuits 201, 202, cf. FIGS. 3–4) for the output stages (e.g., cf. FIG. 2, portions 110, 120) which sets the line output voltages (e.g., $V_{HIGH}$ and $V_{LOW}$) to predetermined values when predetermined currents are detected (cf. conditions (A), (B), (C) in equations (30) to (40)).

Figure 1:
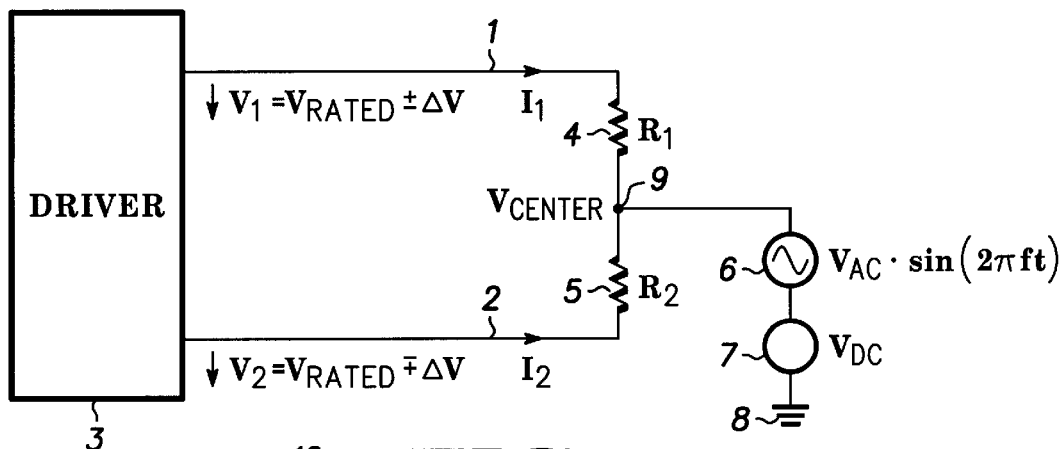
FIG. 1 illustrates a simplified block diagram of a data transmission system according to the LVDS Standard.
Figure 2:
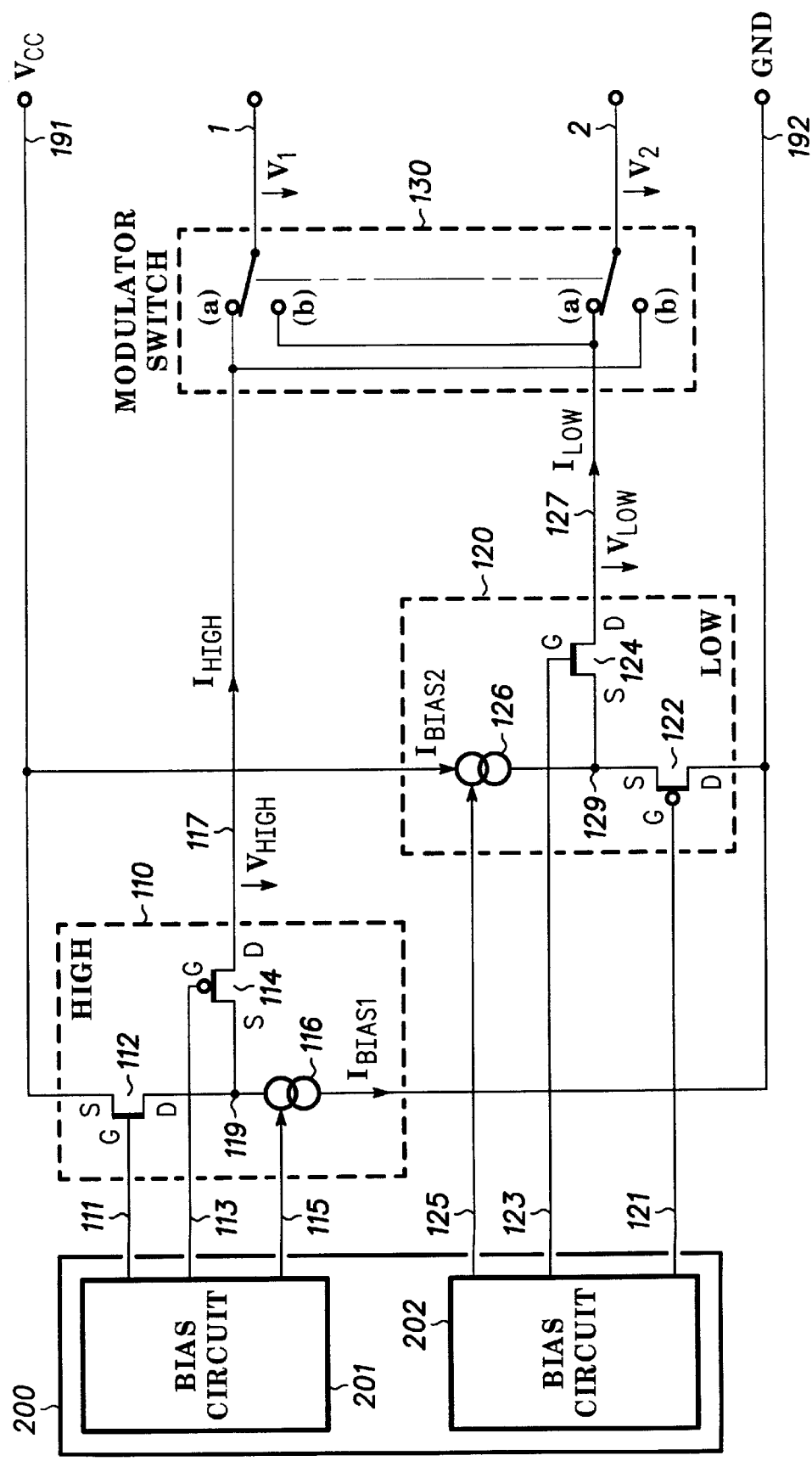
FIG. 2 illustrates a simplified circuit diagram of a LVDS driver according to the present invention.

FIG. 2 illustrates a simplified circuit diagram of LVDS driver 100 according to the present invention. In data transmission system 10 of FIG. 1, driver 100 can be used in the function of driver 3. Driver 100 comprises high side driver portion 110, low side driver portion 120 (dashed frames, labeled "HIGH" and "LOW", respectively), modulator switch 130 (dashed frame), as well as control circuit 200 with bias circuits 201 and 202. Driver 100 is coupled to reference terminals 191 and 192 at potentials VCC and GND, respectively (e.g., VCC=3.3 volts, GND=zero). Similar as driver 3 in FIG. 1, driver 100 provides differentially provides binary signals at lines 1 and 2.

For simplicity, FIG. 2 does not illustrate the connections of lines 1 and 2 to load resistors 4 and 5, node 9 ($V_{CENTER}$) voltage sources 6 and 7, and ground 8. The potential at ground 8 can be different from the potential at terminal 192. For convenience of explanation, both potentials are assumed to be equal.

Driver 100 provides output resistances that are substantially symmetric and that are substantially independent from the center voltage $V_{CENTER}$ (details to follow).

Driver portion 110 (HIGH) keeps line output node 117 at substantially constant potential, that is:

$$V_{HIGH} = V_{RATED} + \Delta V \quad (14)$$

and driver portion 120 (LOW) keeps line output 127 at substantially constant potential $$V_{LOW} = V_{RATED} - \Delta V \quad (16)$$

Modulator switch 130 alternatively forwards $V_{HIGH}$ to line 1 ($V_1 = V_{HIGH}$) and $V_{LOW}$ to line 2 ($V_2 = V_{LOW}$; cf. case (a) in equation (2)) or, vice versa, forwards $V_{LOW}$ to line 1 and $V_{HIGH}$ to line 2 (cf. case (b) in equation (4)). Persons of skill in the art can implement switch 130 without the need for further explanation herein.

Depending on the position of switch 130, current $I_{HIGH}$ flows from output node 117 to line 1 or to line 2 (and further to ground 8, cf. FIG. 1); and, similarly, current $I_{LOW}$ flows from output node 117 to line 2 or to line 1. Since portions 110 and 120 are implemented similarly, the explanation of the present invention concentrates on portion 110 and circuit 201 which provide voltage $V_{HIGH}$ and current $I_{HIGH}$. Persons of skill in the art can apply the teachings of the present invention for portion 120 and circuit 202 accordingly without the need of further explanation.

Portion 110 comprises transistors 112 and 114 and current source 116 (abbreviated as "CS", current $I_{BIAS\ 1}$); and portion 120 comprises transistors 122 and 124 and current source 126 ($I_{BIAS\ 2}$). In portion 110 and in portion 120, transistors 112, 114 and 122, 124, respectively, are of complementary types. Preferably, transistors 112 and 124 are N-FETs and transistors 114 and 122 are P-FETs. This is convenient, but not essential.

In portion 110, transistor 112 has drain D coupled to terminal 191 and source S coupled together at node 119 to CS 116 and to source S of transistor 114. CS 116 is further coupled to terminal 192, and transistor 114 has drain D coupled to line output node 117. Portion 110 is controlled from bias circuit 201 (details in FIGS. 3–4) having control line 111 to gate G of transistor 112, control line 113 to gate G of transistor 114, and control line 115 to CS 116.

Similarly in portion 120, transistor 122 has drain D coupled to terminal 192 and source S coupled together at node 129 to CS 126 and to source S of transistor 124. CS 126 is further coupled to terminal 191, and transistor 124 has drain D coupled to line output 127. Portion 120 is controlled from bias circuit 202 having control line 121 to gate G of transistor 122, control line 123 to gate G of transistor 124, control line 125 to CS 126.

The current sources can be implemented, for example, by transistors having a gate coupled to the control lines. This is convenient, but not essential for the present invention, so that persons of skill in the art can provide other implementations.

The output resistances $R_{OUT}$ (or, more generally, impedance) of driver portions 110 and 120 are the sums of (i) the resistances contributed to by the source follower transistors (112, 122) and (ii) the resistances contributed to by the serial transistors (114, 124), that is:

$$R_{OUT\ 110} = R_{112} + R_{114} \quad (18)$$

$$R_{OUT\ 120} = R_{122} + R_{124} \quad (20)$$

wherein indices correspond to the reference number in FIG. 2.

Assume that switch 130 is in position (a) and that $V_{CENTER}$ increases. With the signals at lines 111 and 113 being substantially unchanged, transistor 114 (P-FET) has a higher conductivity ($R_{114}$ smaller) and transistor 112 (N-FET) has a lower conductivity ($R_{112}$ larger). Now assume that $V_{CENTER}$ decreases. Resistance changes occur in the opposite direction. Transistor 114 has a lower conductivity ($R_{114}$ larger) and transistor 112 has a higher conductivity ($R_{112}$ smaller). The same rule applies for transistors 122 and 124 of portion 120. In other words, resistance changes compensate each other, that is $$\Delta R_{112} = -\Delta R_{114} \quad (22)$$

$$\Delta R_{122} = -\Delta R_{124} \quad (24)$$

However, to achieve this over a large range of $V_{CENTER}$ and to accommodate temperature changes, manufacturing mismatches, and changes in the supply voltage (e.g., VCC), the bias signals at control lines 111, 113, 115 (portion 110, bias circuit 201) and control lines 121, 123, 125 (portion 120, bias circuit 202) need to be changed as well.

Figure 3:
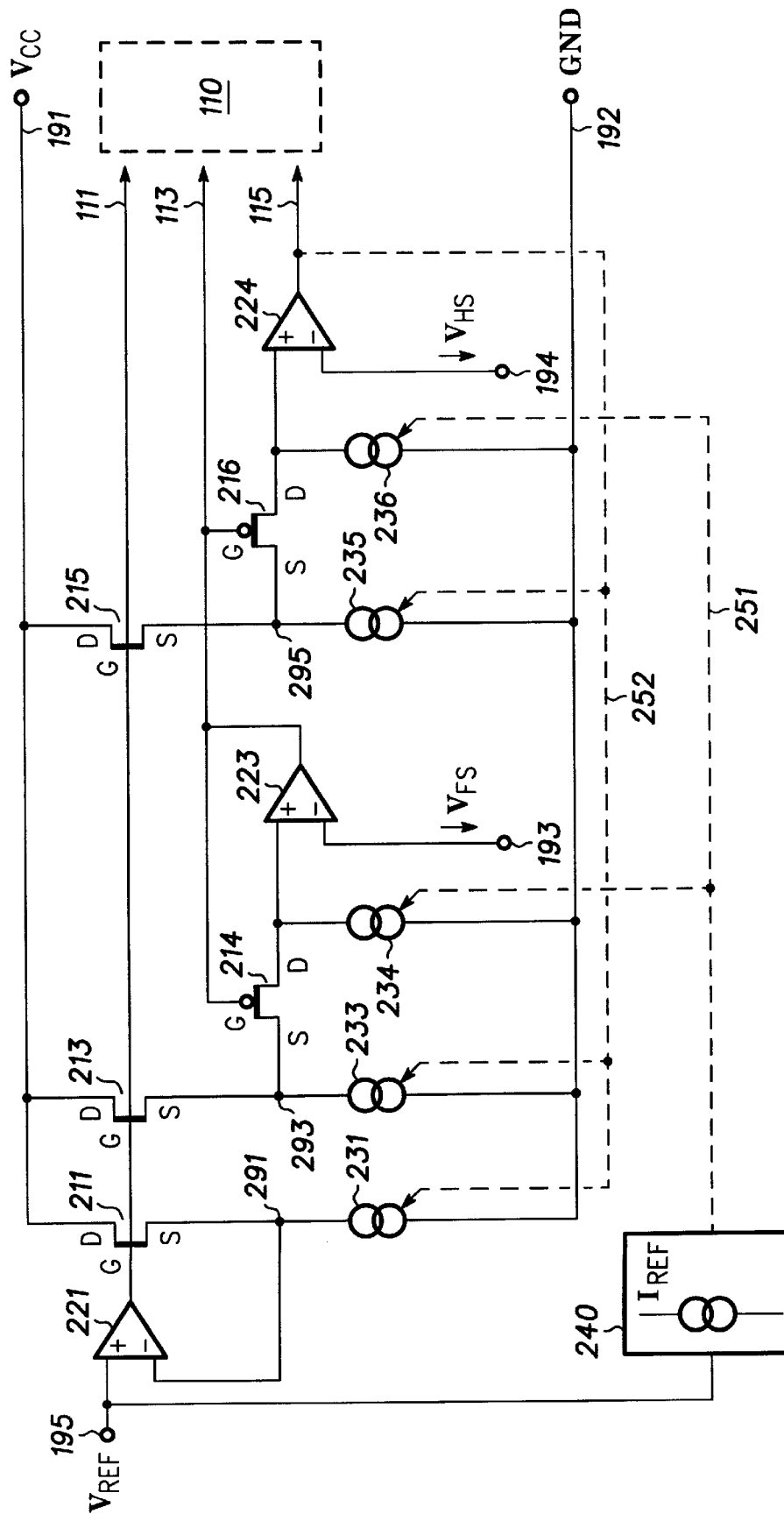
FIG. 3 illustrates a simplified circuit diagram of a bias circuit used in the driver of FIG. 2.

FIG. 3 illustrates a simplified circuit diagram of bias circuit 201 used in driver 100 of FIG. 2. FIG. 3 is also illustrative for bias circuit 202 which can also be provided similar to bias circuit 201, based on the description herein, by persons of skill in the art. Bias circuit 201 is part of driver 100 and is coupled to reference terminals 191 (VCC) and 192 (GND). Bias circuit 201 further receives reference voltages $V_{REF}$, $V_{FS}$, and $V_{HS}$ from reference terminals 195, 193 and 194. Bias circuit 201 provides signals to control lines 111, 113 and 115 going to portion 110 (arrows to dashed box). Preferably, bias circuit 201 comprises operational amplifier 221, 223, 224 ("op amps"), transistors 211, 213, 214, 215, 216, current sources (CS) 231, 233, 234, 235, 236, and reference current source 240 ($I_{REF}$, details in FIG. 4). Current scaling connections 251 and 252—illustrated by dashed lines—symbolize that currents provided by CS 234 and 236 are derived (scaled) from reference CS 240 and that currents provided by CS 231, 233 and 235 are related to the signal at control line 115. Preferably, connections 251 and 252 are implemented by current mirrors. Persons of skill in the art can accomplish this without the need of further explanation, so that details are left out for simplicity.

Preferably, transistors 211, 213 and 215 are N-FETs, and transistors 214 and 216 are P-FETs. The elements of bias circuit 201 are coupled as follows: The drains D of transistors 211, 213 and 215 (N-FETs) are coupled to terminal 191. The sources S of transistors 211, 213 and 215 (nodes 291, 293 and 295, respectively) are coupled to terminal 192 via current sources 231, 233 and 235, respectively. The source S of transistor 211 (i.e. node 291) is also coupled to the inverting input (minus symbol) of op amp 221; the source S of transistor 213 (i.e. node 293) is also coupled to the source S of transistor 214 (P-FET); and the source S of transistor 215 (i.e. node 295) is coupled to the source S of transistor 216 (P-FET). The drain D of transistor 214 goes to the non-inverting input (plus symbol) of op amp 223; the drain D of transistor 216 goes to the non-inverting input (+) of op amp 224. CS 234 is coupled between D of transistor 214 and terminal 192.

The inverting inputs (−) of op amps 223 and 224 are coupled to terminals 193 and 194, respectively ($V_{FS}$ and $V_{HS}$). The output of op amp 221 forms line 111 and goes to the gates G of transistors 211, 213 and 215; the output of op amp 223 forms line 113 and goes to the gates G of transistors 214 and 216; and the output of op amp 224 forms line 115. The non-inverting input (+) of op amp 221 is coupled to terminal 195 ($V_{REF}$). Reference CS 240 is also coupled to terminal 195 to receive $V_{REF}$. CS 236 is coupled between D of transistor 216 and terminal 192.

Preferably, terminals 195, 193 and 194 provide reference voltages $V_{REF}$, $V_{FS}$ and $V_{HS}$ as follows. The magnitude of $V_{REF}$ corresponds to the voltage at output node 117 (cf. FIG. 2) when load resistors 4 and 5 are disconnected ("open-circuit"). For LVDS applications, the $V_{REF}$ is standardized to $V_{REF}$=1600 mV. $V_{FS}$ (FS standing for "full swing") and $V_{HS}$ (for "half swing") relate to $V_{REF}$ and to $\Delta V_{MAX}$ (introduced in background section), these are:

$$\begin{aligned} V_{FS} &= S_{FS} * [V_{REF} - 2 * \Delta V_{MAX}] \\ &= 1600 \text{ mV} - 2 * 250 \text{ mV} \quad \text{(for example)} \\ &= 1100 \text{ mV} \end{aligned} \quad (26)$$

$$\begin{aligned} V_{HS} &= S_{HS} * [V_{REF} - \Delta V_{MAX}] \\ &= 1600 \text{ mV} - 250 \text{ mV} \quad \text{(for example)} \\ &= 1350 \text{ mV} \end{aligned} \quad (28)$$

Factors $S_{FS}$ and $S_{HS}$ are scaling factors. For convenience of explanation, $S_{FS}$ and $S_{HS}$ are assumed to equal 1. Providing reference voltages is well known in the art, so that those of skill in the art are able to make the necessary arrangements (e.g., defining $S_{FS}$ and $S_{HS}$) without further explanation herein. In the preferred embodiment, voltages $V_{REF}$, $V_{FS}$, and $V_{HS}$ are derived from a bandgap reference circuit. Such references are well known in the art and described, for example, by the following reference: Horowitz, P., Hill, W.: "The Art of Electronics", Second Edition, Cambridge University Press, 1990, ISBN 0-521-37095-7, chapter 6.15 "Bandgap reference" on pages 335–341.

Preferably, under "full load" condition when the load (resistors 4 and 5) draws a maximum currrent, the voltage $V_{HIGH}$ at output node 117 corresponds to voltage $V_{FS}$. Similarly, under "half load" condition when the load draws a smaller amount of current, the voltage $V_{HIGH}$ corresponds to $V_{HS}$.

Figure 4:
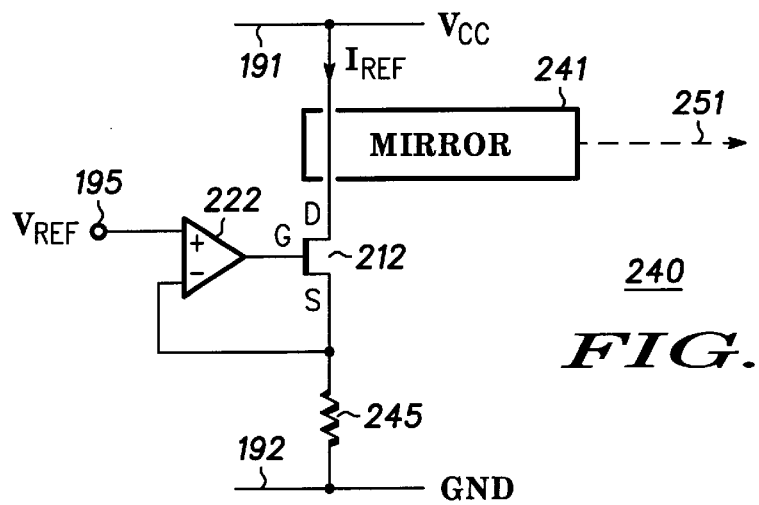
FIG. 4 illustrates a simplified circuit diagram of a reference current source.

FIG. 4 illustrates a simplified circuit diagram of reference current source 240 comprising op amp 222, transistor 212 (preferably, N-FET) and external resistor 245. Transistor 212 has drain D coupled to reference terminal 191 (VCC, cf. FIGS. 2–3); source S coupled to the inverting input (−) of op amp 222 and to reference terminal 192 (GND, cf. FIGS. 2–3) via external resistor 245; and gate G coupled to the output of op amp 222. Op amp 222 receives $V_{REF}$ from terminal 195 (cf. FIG. 3). By applying $V_{REF}$ across resistor 245, CS 240 provides a substantially constant drain current $I_{REF}$. As symbolized by current mirror 241 (between drain D and terminal 191), a representation of current $I_{REF}$ is forwarded to the other elements of bias circuit 201 (cf. FIG. 3) via connection 252. Reference CS 240 can also be implemented by other means.

Bias circuit 201 has 3 control circuits (i), (ii) and (iii) which ensure that driver portion 110 of driver 100 provides voltage $V_{HIGH}$ and current $I_{HIGH}$ in a preferably linear relation. For convenience of explanation, the relation is illustrated first.

Figure 5:
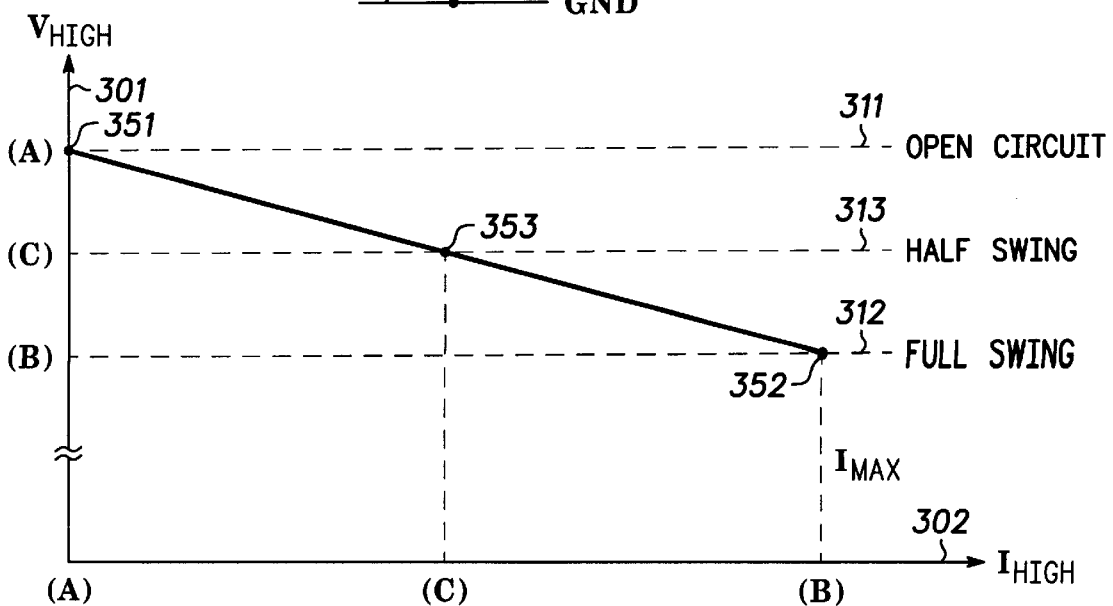
FIG. 5 illustrates a simplified diagram for a predetermined voltage-to-current relation at an output node of the driver of FIG. 2.

FIG. 5 illustrates simplified diagram 300 for a predetermined voltage-to-current relation at output node 117 of driver 100. Diagram 300 illustrates voltage $V_{HIGH}$ (e.g., from node 117 to terminal 192, cf. FIG. 2) by vertical axis 301 and illustrates current $I_{HIGH}$ (e.g., node 117 to ground via line 1 or line 2, cf. FIGS. 1–2) by horizontal axis 302. The voltage is a convenient representation for a first electrical quantity; the current is a convenient representation for a second electrical quantity. Persons of skill in the art are able, based on the description herein, to define the relation otherwise, with current as "first" and voltage as "second" quantity.

By dashed horizontal lines 311–313, diagram 300 illustrates first (A), second (B) and third (C) predetermined values of voltage $V_{HIGH}$ for the following assumed operating conditions:

(A) $V_{HIGH} = V_{REF}$  (30)

$= 1600$ mV  (example)

It is assumed that load resistors 4 and 5 are disconnected. In other words, case (A) describes an "open circuit voltage".

(B) $V_{HIGH} = V_{REF} - 2 * \Delta V_{MAX}$  (32)

$= 1100$ mV  (example)

It is assumed that $\Delta V = \Delta V_{MAX}$ (i.e., full signal swing).

(C) $V_{HIGH} = V_{REF} - \Delta V_{MAX}$  (34)

$= 1350$ mV  (example)

It is assumed that $\Delta V = \Delta V_{MAX}/2$ (i.e., half signal swing).

Voltage-current relation 350 is illustrated by line 350 crossing lines 311–313 for the following predetermined first, second and third current values:

(A) $I_{HIGH} \approx 0$  (substantially zero current, point 351)  (36)

(B) $I_{HIGH} = I_{MAX}$  (point 352)  (38)
$= 10$ mA  (example)

(C) $I_{HIGH} = I_{MAX}/2$  (point 353)  (40)
$= 5$ mA  (example)

In other words, relation 350 indicates outputs resistance $R_{OUT}$ of driver 110 which is substantially independent from $\Delta V$ and $V_{CENTER}$ (i.e., linear resistance). For case (B), driver resistance $R_{OUT}$ complies with the standard at the extreme magnitude of the differential voltages $V_1$ $V_2$.

Persons of skill in the art are able to use other predetermined voltage/current values without departing from the present invention. For example, scaling factors can be introduced in any of equations (30) to (40).

It will now be explained how the control circuits ensure relation 350. Control circuit (i) is formed by op amp 221, transistor 211 and CS 231. Op amp 221 receives $V_{REF}$ (terminal 195) and provides the gate voltage (signal at line 111) for transistor 112 (cf. FIG. 2). The current through CS 231 is related to the current through CS 116 (cf. FIG. 2) due to current scaling connection 252.

Control circuit (ii) is formed by reference CS 240, op amp 223 and transistors 213 and 214. The arrangement of transistors 213 and 214 and CS 233 has a similar structure as driver portion 110. Transistors 213 and 214 are scaled to transistors 112 and 114, respectively, of driver portion 110. Connection 251 scales $I_{REF}$ by a faktor k such that current $I_{234}$ (through CS 234) equals $I_{MAX}$ (full swing, see condition B), that is:

$I_{234} = I_{MAX} = k*I_{REF}$ for $\Delta V = \Delta V_{MAX}$  (42)

Op amp 223 adjusts the gate potential of transistor 214 (op amp output) such that the potential at the non-inverting input (+) of op amp 223 substantially equals $V_{FS}$ (scaling with $S_{FS}$ optional). The same gate potential is forwarded to transistor 114 (equivalent to transistor 214) of driver portion 110.

Control circuit (iii) operates similar to circuit (ii) and is formed by reference CS 240, CS 233 op amp 224 and transistors 215 and 216. The arrangement of transistors 215 and 216 also has a similar structure as driver portion 110. Transistors 215 and 216 are also scaled to transistors 112 and 114, respectively, of driver portion 110. Connection 251 scales $I_{REF}$ by a factor h such that current $I_{236}$ (through CS 236) equals half of $I_{MAX}$ (half swing, see condition C), that is:

$I_{236} = I_{MAX}/2 = h*I_{REF}$ for $\Delta V = \Delta V_{MAX}/2$  (44)

Scaling by other factors is also possible. Op amp 224 controlling CS 116 of driver portion 110 (cf. FIG. 3, via line 115) also controls current sources 231, 233 and 235 via connection 252.

As mentioned above, portion 120 in connection with bias circuit 202 operates similarly, so that persons of skill in the art can completely implement driver 100 without the need of further explanation herein.

The present invention can also be described as transmitter module 100 (i.e. driver 100) for use in LVDS systems. Module 100 has first driver 110 to provide first current $I_{HIGH}$ to first node 117 at first voltage $V_{HIGH}$ (cf. FIG. 2), second driver 120 to provide second, different current $V_{LOW}$ (i.e., different in magnitude) to second node 127 at second, different voltage $V_{LOW}$ (i.e., different in magnitude, cf. equations (14)(16)) and modulator 130 to forward $I_{HIGH}$ and $I_{LOW}$ alternatively (depending on positions (a) and (b)) to first transmission line 1 and second transmission line 2. Thereby, module 100 differentially transmits binary data signals.

Driver 110 and driver 120 each comprise first transistor 112, 122 and second transistor 114, 124 serially coupled between reference terminals (e.g., terminal 191 for driver 110, terminal 192 for driver 120) and first node 117 (in driver 110) and second node 127 (in driver 120), respectively. Bias circuit 201, 202 measures first current $I_{HIGH}$ and second current $I_{LOW}$ by scaling, and biases transistor 112, 122 and transistor 114, 124 such that for first predetermined current values (cf. A in abscissa 302 of diagram 300 in FIG. 5), driver 110 and 120 provides first voltage $V_{HIGH}$ and second voltage $V_{LOW}$, respectively, with predetermined first voltage values (cf. A in ordinate 301), and for second predetermined current values (cf. B in abscissa 302), drivers 110 and 120 provide first voltage $V_{HIGH}$ and second voltage $V_{LOW}$ with predetermined second voltage values (cf. B in ordinate 301). First and second predetermined values of currents and voltages are related such that the output resistances of drivers 110 and 120 in respect to transmission lines 1 and 2 are substantially linear.

Having described details for a preferred embodiment above, the present invention is now described as an apparatus (part of driver 100) for providing a first electrical quantity (e.g., voltage or current) and a second electrical quantity (e.g., current or voltage, respectively) to output node 117 in a predetermined relation between the quantities. First variable resistance 112 (e.g., implemented by "first" FET) and second variable resistance 114 (e.g., implemented by "second" FET) are serially coupled between first reference terminal 191 and output node 117; and, preferably, output node 117 drains an output current (e.g., $I_{HIGH}$ to terminal 192). Variable current source 116 (e.g., implemented by "third" FET) is coupled between output node 117 and second reference terminal 192. First control means (e.g., transistor 211, CS 231, op amp 221 in FIG. 3) controls first variable resistance 112 to set the first electrical quantity (e.g., voltage $V_{HIGH}$) to a first predetermined value (e.g., value A, cf. FIG. 5) when the second electrical quantity (e.g., current $I_{HIGH}$) has a first predetermined value (e.g., A). Second control means (e.g., CS 240, transistor 213, CS 233, transistor 214, op amp 223) controls second variable resistance 114 to set the first electrical quantity (e.g., $V_{HIGH}$) to a second predetermined value (e.g., B) when the second electrical quantity (e.g., $I_{HIGH}$) has a second predetermined value (e.g., B). Third control means (e.g., using CS 240, transistor 215, CS 235, CS 236, op amp 224) controls variable current source 116 to set the first electrical quantity (e.g., $V_{HIGH}$) to a third predetermined value (e.g., C) when the second electrical quantity (e.g., $I_{HIGH}$) has a third predetermined value (e.g., C).

Variable resistances 112 and 114 as well as variable current source 116 are, preferably, implemented by "first", "second" and "third" transistors which receive bias voltages.

First, second and third control means each have first control transistor (e.g., transistors 211, 213, 215, respectively) scaled to first transistor 112 and have a control current source (e.g., CS 231, 233, 235, respectively) scaled to variable current source 116. The first control transistor is coupled between first reference terminal 191 and an intermediate node (e.g., node 291, 293, 295, respectively) and the control current source is coupled between the intermediate node and second reference terminal 192.

Preferably, the first control transistor (211, 213, 215, respectively) of the first, second and third control means is coupled to an output of a first operational amplifier (e.g., op amp 221) with a first input (e.g.,+input) receiving a first reference voltage (e.g., $V_{REF}$) and a second input (e.g.,−input) at the intermediate node (e.g., node 291) of the first control means.

Preferably, the second and third control means each have a second control transistor (e.g., transistors 214, 216, respectively) scaled to second transistor 114 with a first main electrode (e.g., source S) at the intermediate node (293, 295, respectively) and a second main electrode (e.g., drain D) coupled to the second transistor 114 and to the third transistor 116, respectively. The second main electrode (S) of the control transistor (214, 216, respectively) is coupled to the second transistors 114 and to the third transistor 116 transistors via second op amp 223 and third op amp 224.

Second op amp 223 and third op amp 224 receive second ($V_{FS}$) and third ($V_{HS}$) reference voltages, respectively, which correspond to second (B) and third (C) predetermined values of the first electrical quantity. The first (A), second (B) and third (C) predetermined values of the first (e.g., voltage) and second quantities (e.g., current) provide that the predetermined relation between the quantities is substantially linear.

Preferably, the first control means controls first variable resistance 112 such that the first predetermined value (e.g., A) of the first electrical quantity (e.g., voltage) is an open circuit voltage (cf. voltage at A in FIG. 5) and the first predetermined value (e.g., A) of the second electrical quantity is a zero current (cf. A at zero in FIG. 5).

Preferably, the second control means controls the second variable resistance 114 such that a voltage as first electrical quantity at output node 117 corresponds to a full swing signal voltage (cf. equation (26)) when the output current (e.g., $I_{HIGH}$ at line 117) as second electrical quantity has a maximum value (cf. equation (38) and B).

Preferably, the third control means controls variable current source 116 such that a voltage as first electrical quantity at output node 117 corresponds to a reduced swing voltage (cf. equation (28)) when the output current (as second electrical quantity) is smaller than its maximum.

The apparatus is, preferably, coupled at output node 117 to a transmission line (e.g., line 1 or line 2) for data transfer. References for driver 110 (like "HIGH", 112, 114, 116) are convenient for explanation, but not essential. Those of skill in the art can implement the apparatus also for driver 120 (references "LOW", 122, 124, 126). In other words, the apparatus can have—optionally—further output node 127 coupled to a further transmission line (e.g., line 2 or line 1) to differentially provide binary signals.

A method of the present invention can be described as a method to provide energy to a line input (e.g., node 117 [127], FIG. 2) of a data transmission line (e.g., line 1 or 2, depending on switch 130) which has a substantially constant output resistance ($R_1$, $R_2$, e.g., provided by load resistors 4 and 5) by a driver (e.g., driver 110[120]) having first transistor 112[122] with main electrodes between at first reference line 191[192]) and node 119[129], second transistor 114[124] with main electrodes between node 119[129] and the line input, and third transistor 116[126] (current source) with main electrodes between node 119[129] and second reference line 192[191] (reference numbers in [ ] referring to driver 120).

The method comprises the steps • monitoring the current $I_{HIGH}$ [$I_{LOW}$] at the line output, and • changing the conductivity of first transistor 112[122] such that the voltage at the line input assumes a first predetermined value (e.g., A on ordinate 301 in FIG. 5, open-circuit voltage) when the current has a first predetermined value (e.g., A on abscissa 302, substantially zero); changing the conductivity of second transistor 114[124] such that the voltage at the line input assumes a second predetermined voltage (e.g., B on ordinate 301, full-swing) when the current has a second predetermined value (e.g., B on abscissa 302, maximum line current $I_{MAX}$); and changing the conductivity of third transistor 116[126] such that the voltage at the line input assumes a third predetermined value (e.g., C on ordinate 301) when current has a third predetermined value (e.g., C on abscissa 302). First (A), second (B) and third (C) predetermined current and voltage values are substantially linearly related (cf. line 350).

While the invention has been described in terms of particular structures, devices and methods, those of skill in the art will understand based on the description herein that it is not limited merely to such examples and that the full scope of the invention is properly determined by the claims that follow.

What is claimed is:

1. Apparatus for providing a first electrical quantity and a second electrical quantity to an output node in a predetermined relation between said quantities, said apparatus comprising:

a first variable resistance;

a second variable resistance wherein said first and second variable resistances being serially coupled between a first reference terminal and said output node;

a variable current source coupled between said output node and a second reference terminal;

a first control means for controlling said first variable resistance to set said first electrical quantity to a first predetermined value when the second electrical quantity has a first predetermined value;

a second control means for controlling said second variable resistance to set said first electrical quantity to a second predetermined value when the second electrical quantity has a second predetermined value; and a third control means for controlling said variable current source to set said first electrical quantity to a third predetermined value when the second electrical quantity has a third predetermined value;

wherein said first and second variable resistances are first and second transistors, respectively, receiving bias voltages;

wherein said variable current source is a third transistor and said first, second and third control means control said first variable resistance, said second variable resistance and said variable current source, respectively, by bias voltages;

wherein said first second and third control means each have a control transistor scaled to said first transistor and a control current source scaled to said variable current source, said first control transistor coupled between said first reference terminal and an intermediate node and said control current source coupled between said intermediate node and said second reference terminal; and wherein said first control transistor of said first, second and third control means is coupled to an output of a first operational amplifier with a first input receiving a first reference voltage and a second input at said intermediate node of said first control means.

2. Apparatus for providing a first electrical quantity and a second electrical quantity to an output node in a predetermined relation between said quantities, said apparatus comprising:

a first variable resistance;

a second variable resistance wherein said first and second variable resistances being serially coupled between a first reference terminal and said output node;

a variable current source coupled between said output node and a second reference terminal;

a first control means for controlling said first variable resistance to set said first electrical quantity to a first predetermined value when the second electrical quantity has a first predetermined value;

a second control means for controlling said second variable resistance to set said first electrical quantity to a second predetermined value when the second electrical quantity has a second predetermined value; and a third control means for controlling said variable current source to set said first electrical quantity to a third predetermined value when the second electrical quantity has a third predetermined value;

wherein said first and second variable resistances are first and second transistors, respectively, receiving bias voltages;

wherein said variable current source is a third transistor and said first, second and third control means control said first variable resistance, said second variable resistance and said variable current source, respectively, by bias voltages;

wherein said second and third control means each have a control transistor scaled to said second transistor with a first main electrode at said intermediate node and a second main electrode coupled to said second and third transistors, respectively;

wherein said second main electrode of said control transistor is coupled to said second and third transistors via second and third operational amplifiers.

3. The apparatus of claim 2 wherein said second and third operational amplifiers receive second and third reference voltages, respectively, which correspond to said second and third predeterimined values of said first electrical quantity.

4. The apparatus of claim 2 wherein said first, second and third predetermined values of said first and second quantities provide that said relation is substantially linear.

5. The apparatus of claim 3 coupled at said output node to a transmission line for data transfer.

6. The apparatus of claim 5 having a further output node coupled to a further transmission line to differentially provide binary signals.

7. A transmitter module for use in LVDS systems, the module comprising:

a first driver to provide a first current to a first node at a first voltage;

a second driver to provide a second, different current to a second node at a second, different voltage; wherein said first driver and said second driver each have a first transistor and a second transistor serially coupled between reference terminals and said first and second nodes, respectively, and a bias circuit to measure said first and second currents by scaling, and to bias said first and second transistors such that for first predetermined current values, said drivers provide said first and second voltages with predetermined first voltage values, and for second predetermined current values, said drivers provide said first and second voltages with predetermined second voltage values, said first and second predetermined values of currents and voltages being related such that the output resistances of said first and second drivers in respect to said first and second transmission lines are substantially linear; and a modulator to differentially transmit binary data signals by alternatively (a) forwarding said first current to a first transmission line and said second current to a second transmission line, and (b) forwarding said first current to said second transmission line and said second current to said first transmission line.

\* \* \* \* \*